US012306055B2

(12) United States Patent
Tanaami et al.

(10) Patent No.: US 12,306,055 B2
(45) Date of Patent: May 20, 2025

(54) FORCE SENSOR

(71) Applicants: SINTOKOGIO, LTD., Nagoya (JP); TOHOKU UNIVERSITY, Sendai (JP)

(72) Inventors: Yoshikane Tanaami, Nagoya (JP); Miyuki Hayashi, Nagoya (JP); Yoshiaki Kanamori, Sendai (JP); Taiyu Okatani, Sendai (JP)

(73) Assignees: SINTOKOGIO, LTD., Aichi (JP); TOHOKU UNIVERSITY, Miyagi (JP)

( * ) Notice: Subject to any disclaimer, the term of this patent is extended or adjusted under 35 U.S.C. 154(b) by 134 days.

(21) Appl. No.: 18/168,862

(22) Filed: Feb. 14, 2023

(65) Prior Publication Data

US 2023/0266184 A1 Aug. 24, 2023

(30) Foreign Application Priority Data

Feb. 24, 2022 (JP) ................................ 2022-027127

(51) Int. Cl.
*G01L 1/24* (2006.01)

(52) U.S. Cl.
CPC .................................... *G01L 1/24* (2013.01)

(58) Field of Classification Search
CPC ........................................................ G01L 1/24
USPC .................................................... 73/862.624
See application file for complete search history.

(56) References Cited

U.S. PATENT DOCUMENTS 2,752,558 A 6/1956 Kane
4,933,545 A * 6/1990 Saaski .................... G01L 11/02 250/231.19
5,199,303 A 4/1993 Benedikt et al.
5,249,468 A 10/1993 Benedikt et al.
5,483,994 A 1/1996 Maurer
5,503,023 A 4/1996 Benedikt et al.
5,703,282 A 12/1997 Kuesell et al.
6,820,487 B2 * 11/2004 Esashi .................. G01L 9/0077 73/705
8,066,681 B1 * 11/2011 Hall ...................... G01L 9/0077 604/533
9,201,105 B2 12/2015 Iida et al.
9,534,972 B2 1/2017 Eichhorn et al.
9,785,297 B2 10/2017 Kawaguchi et al.
(Continued)

FOREIGN PATENT DOCUMENTS

CN 1649803 A 8/2005
DE 4103706 A1 1/1992
(Continued)

OTHER PUBLICATIONS

Translation of JP-2020094973-A (Year: 2020).*
(Continued)

*Primary Examiner* — Nathaniel T Woodward
(74) *Attorney, Agent, or Firm* — Harness, Dickey & Pierce, P.L.C.

(57) ABSTRACT

A force sensor is provided, the force sensor including: a first substrate; a metasurface pattern provided on a principal surface; a protective layer covering the metasurface pattern; a second substrate provided so as to face the first substrate; a reflective layer provided on a second principal surface; and a spacer defining a spacing between the first substrate and the second substrate, so that the force sensor is capable of offering desired response characteristics specified at the time of design.

5 Claims, 2 Drawing Sheets

(56) References Cited

U.S. PATENT DOCUMENTS

| | | | | |
|---|---|---|---|---|
| 10,886,605 | B2 | 1/2021 | Varel et al. | |
| 2005/0138892 | A1 | 6/2005 | Misonou | |
| 2014/0318273 | A1* | 10/2014 | Dong | G01K 11/3206 374/161 |
| 2016/0349128 | A1 | 12/2016 | Kaufmann et al. | |
| 2019/0064532 | A1* | 2/2019 | Riley, Jr. | G02B 27/0927 |
| 2020/0158557 | A1 | 5/2020 | Le Floc'H | |
| 2021/0088392 | A1* | 3/2021 | Kagan | G01L 1/24 |

FOREIGN PATENT DOCUMENTS

| | | | |
|---|---|---|---|
| JP | 2000/294759 | A | 10/2000 |
| JP | 2004/311345 | A | 11/2004 |
| JP | 5660122 | B2 | 1/2015 |
| JP | 2020094973 | A * | 6/2020 |
| WO | 2020/014356 | A1 | 1/2020 |

OTHER PUBLICATIONS

U.S. Appl. No. 18/179,547, filed Mar. 7, 2023.
U.S. Appl. No. 18/179,608, filed Mar. 7, 2023.
U.S. Office Action for U.S. Appl. No. 18/179,547 mailed Apr. 7, 2025.
U.S. Office Action for U.S. Appl. No. 18/112,179 mailed Apr. 7, 2025.

* cited by examiner

FORCE SENSOR

This Nonprovisional application claims priority under 35 U.S.C. § 119 on Patent Application No. 2022-027127 filed in Japan on Feb. 24, 2022, the entire contents of which are hereby incorporated by reference.

TECHNICAL FIELD

The present invention relates to a force sensor.

BACKGROUND ART

There is a known force sensor that includes: a metasurface pattern provided on a first substrate; a reflective layer provided on a second substrate so as to face the metasurface pattern; and a spacer defining a spacing between the first substrate and the second substrate (e.g., Patent Literature 1). In such a force sensor, light enters the metasurface pattern, and the light that passes through the metasurface pattern and that is reflected by the reflective layer is used to obtain information concerning the spacing between the metasurface pattern and the reflective layer. The spacing depends on the magnitude of a force acting on the second substrate. This enables the force sensor to detect the magnitude of the force acting on the second substrate by an optical technique.

CITATION LIST

Patent Literature

[Patent Literature 1]
Japanese Patent Application Publication, Tokukai, No. 2020-94973

SUMMARY OF INVENTION

Technical Problem

In the production of the force sensor as described in Patent Literature 1, after the first substrate having the metasurface pattern provided thereon, the second substrate having the reflective layer provided thereon, and the spacer are produced separately, a step of stacking and joining together the force sensor, the spacer, and the second substrate in this order is performed.

If foreign matter (e.g., air dust) adheres to the surfaces of the metasurface pattern and the reflective layer, it will be difficult to obtain desired response characteristics specified at the time of design. In order for such dust to adhere, it is preferable that a step of cleaning the first substrate and the second substrate be performed prior to a step of joining together the first substrate, the spacer, and the second substrate.

However, performing such cleaning can cause oxidation of the surface of the metasurface pattern due to direct exposure of the metasurface pattern to a cleaning liquid. Like the aforementioned foreign matter, such oxidation of the surface of the metasurface pattern can change the desired response characteristics specified at the time of design. Unlike the reflective film, which is a continuous film, the metasurface pattern is composed of a plurality of small sub patterns, and has a thinner film thickness than the reflective film. The metasurface pattern is therefore more susceptible to an effect of oxidation caused by the cleaning liquid than the reflective film is.

An aspect of the present invention has been made in view of the aforementioned problem, and an object thereof is to provide a force sensor capable of offering desired response characteristics specified at the time of design.

Solution to Problem

In order for the above problems to be solved, a force sensor in accordance with a first aspect of the present invention includes: a first substrate having light transparency; a metasurface pattern provided on a first principal surface of the first substrate; a protective layer that has light transparency and that covers the metasurface pattern; a second substrate provided so as to face the first substrate and including a second principal surface that faces the first principal surface; a reflective layer provided on the second principal surface; and a spacer defining a spacing between the first substrate and the second substrate.

Advantageous Effects of Invention

According to an aspect of the present invention, it is possible to reduce adverse effects including oxidation that may be caused in the metasurface pattern in a production process.

DESCRIPTION OF EMBODIMENTS

Figure 1:
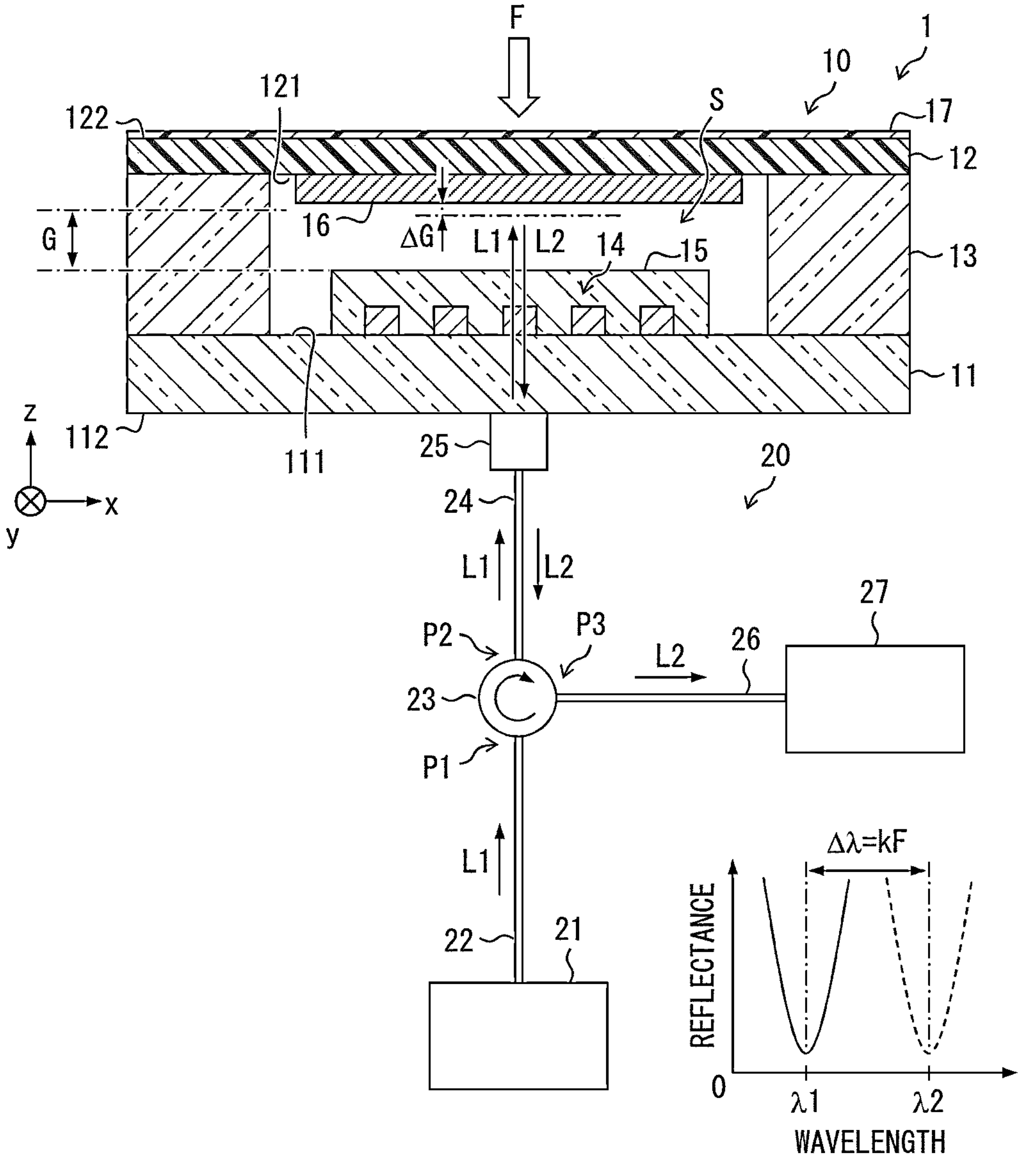
FIG. 1 is a schematic view of a force sensor system that includes a force sensor in accordance with an embodiment of the present invention, FIG. 1 including a cross-sectional view of the force sensor.

The following description will discuss a force sensor 10 in accordance with an embodiment of the present invention and a force sensor system 1 including the force sensor 10, with reference to FIG. 1. In addition, the force sensor 10 will be described with reference to FIG. 2.

[Configuration of Force Sensor]

The force sensor 10 includes: a first substrate 11; a second substrate 12; a spacer 13; a metasurface pattern 14; a protective layer 15; a reflective layer 16; and a hard-coat layer 17, as illustrated in FIG. 1.

In the force sensor 10, a point load F is detected in a condition where, among the first substrate 11 and the second substrate 12, the second substrate 12 is subjected to the action of the point load F.

<First Substrate>

The first substrate 11 is a plate-shaped member having light transparency. In the present embodiment, non-alkali glass is employed as a material of the first substrate 11. The material of the first substrate 11 only needs to be a solid material transparent to light of the wavelength band of light L1 (which will be described later), and can be appropriately selected from among commercially available materials. Other examples of the material of the first substrate 11 include: quartz; and a polycarbonate resin. Note that in the present embodiment, the wavelength band of the light L1 is not less than 1400 nm and not more than 1600 nm, as will be described later.

Figure 2:
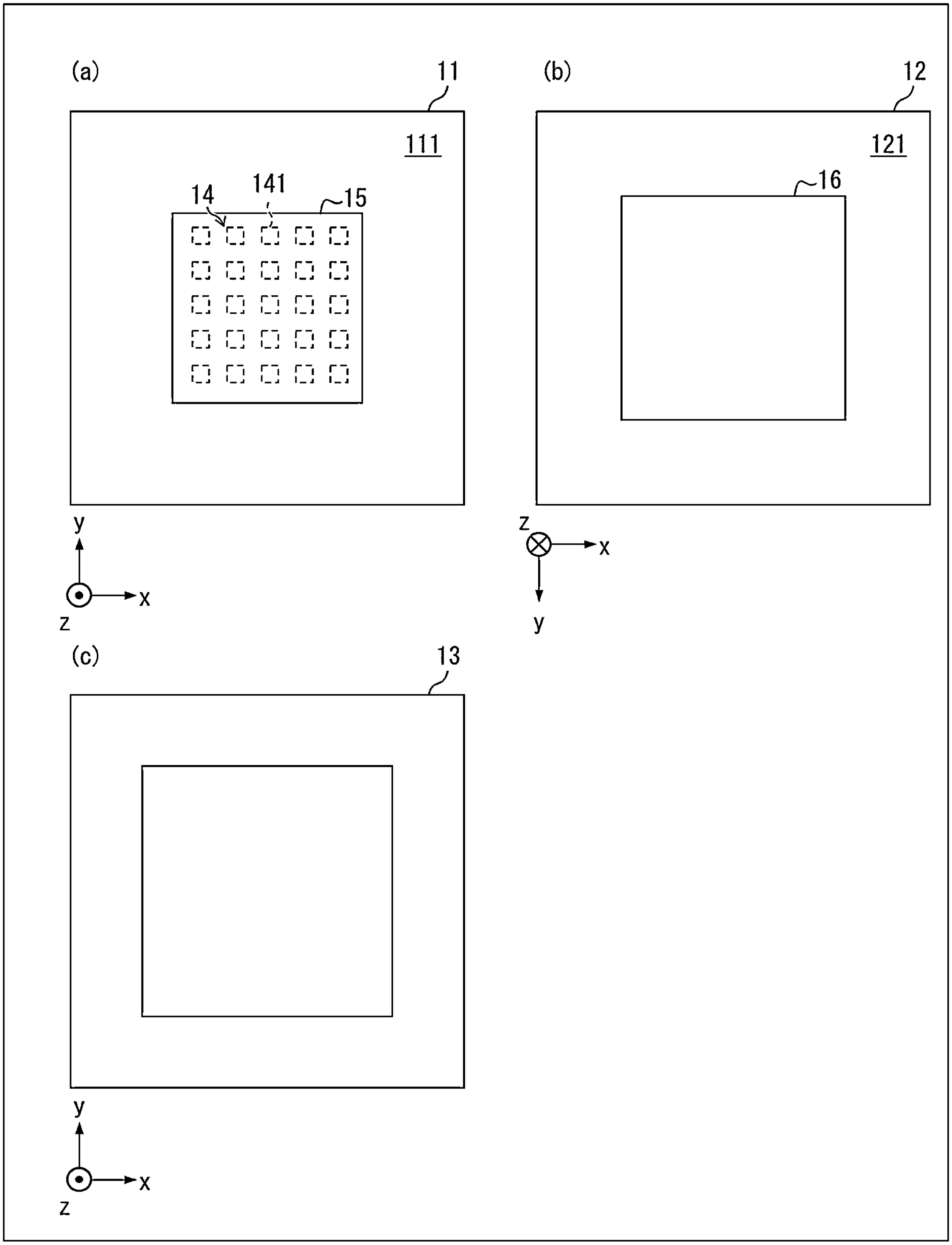
FIG. 2 illustrates plan views of the components of the force sensor illustrated in FIG. 1, FIG. 2 including (a) of FIG. 2 which is a plan view of a first substrate of the force sensor, (b) of FIG. 2 which is a plan view of a second substrate of the force sensor, and (c) of FIG. 2 which is a plan view of a spacer of the force sensor.

In the present embodiment, the shape (see (a) of FIG. 2) of the first substrate 11 in plan view is a 4-cm square. In the present embodiment, the thickness of the first substrate 11 is 500 μm. The shape and thickness of the first substrate 11 are not limited to these examples, but can be appropriately determined. The thickness of the first substrate 11 is preferably not less than 500 μm and not more than 2000 μm.

The first substrate 11 includes a principal surface 111 and a principal surface 112 that constitute a pair of principal surfaces facing each other. In the condition illustrated in FIG. 1, the first substrate 11 is disposed such that the principal surface 111 is located on the upper side and the principal surface 112 is located on the lower side. The principal surface 111 is an example of the first principal surface.

In the force sensor 10, the second substrate 12 is subjected to the action of the point load F, as described above. In such a condition, the force sensor uses the deflection of the second substrate 12 due to the point load F, to detect the point load F. Therefore, the first substrate 11 is preferably designed such that when the second substrate 12 is subjected to the action of the point load F, the first substrate 11 does not deflect or only deflects to the extent that can be ignored when compared to the amount of deflection of the second substrate 12.

(Metasurface Pattern)

The principal surface 111 of the first substrate 11 is provided with a metasurface pattern 14, as illustrated in FIG. 1 and (a) of FIG. 2. Note that the metasurface pattern 14 is covered by the protective layer 15, and is therefore indicated by dashed lines in (a) of FIG. 2.

The metasurface pattern 14 consists of a plurality of sub patterns 141 (25 sub patterns 141 in (a) of FIG. 2) that are periodically arranged. In the present embodiment, the sub patterns 141 are arranged in a matrix with five rows and five columns. Note that (a) of FIG. 2 is a schematic view for illustrating the sub patterns 141 in an understandable manner. In actuality, the metasurface pattern 14 includes more sub patterns 141 (e.g., 10,000 sub patterns 141 for an arrangement of 100 rows and 100 columns).

In the present embodiment, each of the sub patterns 141 (i.e., the metasurface pattern 14) is made of a metal (aluminum, in the present embodiment). The metasurface pattern 14 as illustrated in (a) of FIG. 2 can be obtained by, for example, forming a continuous film of aluminum on the principal surface 111, and then using lithography technology. Each sub pattern 141 has the shape of a 300-nm square. Each sub pattern 141 has a thickness (i.e., the thickness of the metasurface pattern 14) of 30 nm.

Note that the periodic arrangement in the metasurface pattern 14, the material of the metasurface pattern 14, the shape of each sub pattern 141, the size of each sub pattern 141, and the thickness of each sub pattern 141 are not limited to those described above, but can be appropriately determined by reference to existing techniques.

The force sensor 10 includes a protective layer 15 (which will be described later) for the purpose of reducing or preventing oxidation of the metasurface pattern 14 during cleaning. Another idea for inhibiting oxidation of the metasurface pattern 14, without using the protective layer 15 is to use, as the material of the metasurface pattern 14, a material resistant to oxidation, typified by gold and platinum. However, gold and platinum are expensive and therefore not preferable from the perspective of reducing the cost of producing the force sensor 10.

(Protective Layer)

The principal surface 111 of the first substrate 11 is provided with a protective layer 15 completely covering each of the sub patterns 141 that constitute the metasurface pattern 14, as illustrated in (a) of FIG. 2. The protective layer 15 is transparent to light, as is true for the first substrate 11.

In the present embodiment, the protective layer 15 is a continuous film made of quartz glass ($SiO_2$) In the present embodiment, the protective layer 15 has a thickness of 35 nm. The thickness of the protective layer 15 is not limited to this example, but can be appropriately determined. The thickness of the protective layer 15 is preferably not less than 35 nm and not more than 60 nm.

The protective layer 15 is provided for the purpose of reducing or preventing, in a step of cleaning the first substrate 11 provided with the metasurface pattern 14, oxidation of the metasurface pattern 14 (in particular, oxidation on the surface of the metasurface pattern 14) that can be caused by direct exposure of the metasurface pattern 14 to a cleaning liquid (for example, pure water). It is therefore preferable that the protective layer 15 be transparent to light and be formed by a layer dense enough that the layer does not transmit the cleaning liquid.

The protective layer 15 may be any layer provided that the layer is capable of reducing or preventing the aforementioned oxidation of the metasurface pattern 14. The material, the film-deposition method, the thickness, etc. of the protective layer 15 can be appropriately determined.

<Second Substrate>

The second substrate 12 is a plate-shaped member designed to deflect when subjected to the action of the point load F. The second substrate 12 is provided so as to face the first substrate 11, as illustrated in FIG. 1. In the present embodiment, a polycarbonate resin is employed as the material of the second substrate 12. Note that the material of the second substrate 12 only needs to be a solid material that deflects when subjected to the action of the point load F, and can be appropriately selected from among commercially available materials. Other examples of the material of the second substrate 12 include: a resin material typified by an acrylic resin, a polystyrene resin, an AS resin, and a silicone resin; and a metal material typified by aluminum, copper, and stainless steel.

In the present embodiment, the shape (see (b) of FIG. 2) of the second substrate 12 in plan view is a 4-cm square, as is true for the first substrate 11. In the present embodiment, the second substrate 12 has a thickness of 300 μm. The shape and thickness of the second substrate 12 are not limited to these examples, but only need to be designed such that the second substrate 12 deflects with an appropriate amount of deflection when subjected to the action of the point load F. The thickness of the second substrate 12 is preferably not less than 300 μm and not more than 400 μm.

The second substrate 12 includes a principal surface 121 and a principal surface 122 that face each other and that constitute a pair of principal surfaces. The principal surface 121, which is an example of the second principal surface, faces the principal surface 111 of the first substrate 11. The principal surface 122, which faces the principal surface 121, is an examples of a third principal surface. In the condition illustrated in FIG. 1, the second substrate 12 is disposed such that the principal surface 121 is located on the lower side and the principal surface 122 is located on the upper side.

(Reflective Layer)

The principal surface 121 of the second substrate 12 is provided with a reflective layer 16, as illustrated in FIG. 1 and (b) of FIG. 2. The reflective layer 16 is a metal film that reflects the light L1 and accordingly generates light L2 that is a reflected light of the light L1. In the present embodiment, aluminum is employed as the material of the reflective layer 16. Note that the material of the reflective layer 16 only needs to be a solid material that reflects the light L1, and can be appropriately selected from among commercially available metals. Other examples of the material of the reflective layer 16 include gold and silver.

In the present embodiment, the reflective layer 16 has a thickness of 50 nm. The thickness of the reflective layer 16 is not limited to this example, but can be appropriately determined. The thickness of the reflective layer 16 is preferably not less than 50 nm and not more than 100 nm.

The material, the film-deposition method, the thickness, etc. of the reflective layer 16 can be appropriately determined.

(Hard-Coat Layer)

The principal surface 122 is provided with the hard-coat layer 17, as illustrated in FIG. 1. In the present embodiment, the hard-coat layer 17 is provided so as to cover the entirety of the second substrate 12. The hard-coat layer 17 preferably covers as wide an area as possible of a surface of the second substrate 12, the surface being exposed to the outside of the force sensor 10. The hard-coat layer 17 may be provided so as to further cover the edge surface of the second substrate 12.

The hard-coat layer 17 is a covering layer designed in the same way as is the covering layer provided on the surface of a smartphone, a display panel, or the like. In the present embodiment, a silicone resin is employed as the material of the hard-coat layer 17. Note that the material of the hard-coat layer 17 is not limited to this. Other examples of the material of the hard-coat layer 17 include an acrylic resin and a fluororesin.

The hard-coat layer 17 is harder than the material (a polycarbonate, in the present embodiment) of the second substrate 12, and is therefore resistant to scratching. In addition, the hard-coat layer 17 has a property of being less prone to transmit a gas.

<Spacer>

The spacer 13 is a member for defining the spacing (the spacing under no load) between the first substrate 11 and the second substrate 12, as illustrated in FIG. 1. In the present embodiment, the spacer 13 is held between the first substrate 11 and the second substrate 12. The first substrate 11 and the spacer 13 are joined together, and the second substrate 12 and the spacer 13 are joiner together. In the present embodiment, as a joining member for joining the spacer 13 to each of the first substrate 11 and the second substrate 12, a photo-curable resin is used. Note that the joining member is not limited to this, but can be appropriately selected from among commercially available joining members.

In the present embodiment, the thickness of the spacer 13 is determined such that the spacing G between the protective layer 15 and the reflective layer 16 is 190 nm. Further, the amount of deflection of the second substrate 12 observed when the point load F acts on or on the vicinity of the center of the second substrate 12 is defined as the amount of deflection ΔG. When subjected to the action of the point load F, the second substrate 12 deflects with the amount of deflection ΔG. This causes the spacing G to be narrower by the amount of deflection ΔG than the spacing G observed under no load.

As above, interposing the spacer 13 between the first substrate 11 and the second substrate 12 causes the spacing between the first substrate 11 and the second substrate 12 to be fixed. Specifically, a loop-shaped frame, as illustrated in (c) of FIG. 2, having an outer edge and an inner edge each of which is square is employed as the spacer 13. In the present embodiment, the outer edge of the spacer 13 measures 4 cm per side, and has an outline that is the same in shape as the outline of the first substrate 11 and the second substrate 12. Note that the shape of the outer edge of the spacer 13 is not limited to this, and can be appropriately determined. Further, the spacer 13 is not limited to a closed frame, but may contain a portion in which the spacer 13 is not closed. Furthermore, the spacer 13 may be composed of a single member, or may be composed of a plurality of members. In the latter case, each of the plurality of members may be a columnar or cylindrical member serving as a column.

The spacer 13 has a uniform thickness. This makes it possible to fix the first substrate 11 and the second substrate 12 such that the principal surface 111 and the principal surface 121, which hold the spacer 13 therebetween, are parallel to each other.

<Internal Space>

As illustrated in FIG. 1, the force sensor 10 of the present embodiment can be obtained by stacking the first substrate 11, which is provided with the metasurface pattern 14 and the protective layer 15, the spacer 13, and the second substrate 12, which is provided with the reflective layer 16 and the hard-coat layer 17, in this order and then joining the first substrate 11, the spacer 13, and the second substrate 12 together. Therefore, the metasurface pattern 14, the protective layer 15, and the reflective layer 16 are accommodated in an internal space S surrounded by the first substrate 11, the second substrate 12, and the spacer 13.

The internal space S of the force sensor 10 illustrated in FIG. 1 is sealed. According to an aspect of the present invention, the internal space S may be unsealed. In a case where the internal space S is unsealed, at least one selected from the group consisting of the first substrate 11, the second substrate 12, and the spacer 13 only needs to be provided with a vent that brings the internal space S and the space external to the force sensor 10 into communication with each other.

<Effects>

In the force sensor 10, the metasurface pattern 14 provided on the first substrate 11 is protected by the protective layer. This makes it possible to prevent direct exposure of the metasurface pattern 14 to a cleaning liquid even in a case where the first substrate 11 including the metasurface pattern 14 is cleaned in a step following the formation of the metasurface pattern 14 on the principal surface 111. If the metasurface pattern is directly exposed to a cleaning liquid, the surface of the metasurface pattern can be oxidized. The force sensor 10 makes it possible to reduce adverse effects including oxidation that may be caused in the metasurface pattern 14, even in a case where the first substrate 11 including the metasurface pattern 14 is cleaned in the production process. It is therefore possible for the force sensor 10 to offer desired response characteristics specified at the time of design.

The second substrate 12 of the force sensor 10 is preferably made of a metal or a resin. This configuration, unlike the configuration in which the second substrate 12 is made of glass, makes it possible to reduce the possibility that the second substrate 12 is broken even when a greater-than-expected force acts on the second substrate 12. Accordingly, the force sensor of this type makes it possible to increase the safety upon the action of a greater-than-expected force.

It is possible to make larger the ranges of choices of the Young's modulus and the Poisson's ratio of the material of the second substrate 12 in a case of employing the second substrate 12 made of a metal or a resin than in a case of employing the second substrate made of glass. The response characteristics of the force sensor 10 (e.g., the detectable range of force, and the resolution with which a force can be detected) depend on the amount of deflection ΔG observed when the point load F acts. That is, the response characteristics of the force sensor 10 depend on the Young's modulus and the Poisson's ratio of the material of the second substrate 12. For this reason, selecting the material of the second substrate 12 of the force sensor 10 from among metals and resins, rather than glass, makes it possible to enlarge the range of variations of feasible response characteristics. That is, it is possible to enlarge the range of variations of the product lineup of the force sensor 10.

The force sensor 10 preferably includes the hard-coat layer 17. In a case where a resin is employed as the material of the second substrate 12, a gas can continue to be generated from the second substrate 12 even after the force sensor 10 is produced. With the aforementioned configuration, the principal surface 122 of the second substrate 12 is covered by the hard-coat layer 17. The material of the hard-coat layer 17 not only has a high hardness but also is capable of reducing the transmission of a gas. It is therefore possible, in the force sensor 10, to reduce the amount of a gas that may be generated from the second substrate 12.

The internal space S of the force sensor 10 is preferably sealed. With this configuration, it is possible to prevent foreign matter (e.g., air dust) from entering the internal space S. It is therefore possible, in the force sensor 10, to easily keep the response characteristics expected at the time of design.

It is possible to employ, in the force sensor 10, another configuration in which the internal space S and the space external to the force sensor 10 are in communication with each other. With this configuration, in which the internal space S is unsealed, it is possible to maintain the spacing G, under no load, between the first substrate 11 and the second substrate 12 at a predetermined spacing, even in a case where pressure in the external space changes. This makes it possible for this variation of the force sensor 10 to exhibit response characteristics expected at the time of design, regardless of the pressure in the external space.

[Configuration of Force Sensor System]

The force sensor system 1 includes the force sensor described above and a measuring section 20, as illustrated in FIG. 1. Here is a brief description of the measuring section 20.

The measuring section 20 includes: a light source 21; an optical fiber 22; a circulator 23; an optical fiber 24; a collimating lens 25; an optical fiber 26; and a light detecting section 27.

The light source 21 is configured to emit the light L1 having a wavelength band of not less than 1400 nm and not more than 1600 nm. In the present embodiment, a light-emitting diode (LED) that radiates near infrared rays is used as the light source 21. Note that the light source 21 is not limited to an LED, but can be appropriately selected from among commercially available light sources. Further, the light source 21 includes a filter that is provided downstream of this LED and that limits the wavelength band of the light L1 to not less than 1400 nm and not more than 1600 nm.

The circulator 23 is an optical device that has three ports P1, P2, and P3. The circulator 23 is configured to: release, from the port P2, light that enters the port P1; release, from the port P3, light that enters the port P2; and release, from the port P1, light that enters the port P3.

The optical fiber 22 has one and the other ends that are connected respectively to the light source 21 and the port P1 of the circulator 23. Accordingly, the optical fiber 22 allows the light L1 emitted by the light source 21 to enter the port P1 of the circulator 23.

The optical fiber 24 has one and the other ends that are connected respectively to the collimating lens 25 and the port P2 of the circulator 23. Accordingly, the optical fiber 24 allows the light L1 released from the port P2 of the circulator 23 to be released to the collimating lens 25 and allows light L2 entering through the collimating lens 25 to enter the port P2.

The collimating lens 25 converts the light L1 released from the one end of the optical fiber 24 into collimated light. The light L1 having been collimated by the collimating lens 25 is converted, by reflection off the reflective layer 16, into the light L2, which in turn propagates in the reverse direction of the same path. The light L2 enters the one end of the optical fiber 24 through the collimating lens 25. The collimating lens 25 efficiently couples the light L2, which is collimated light as is true for the light L1, to the one end of the optical fiber 24.

The optical fiber 26 has one and the other ends that are connected respectively to the light detecting section 27 and the port P3 of the circulator 23. Accordingly, the optical fiber 26 allows the light L2 released from the port P3 of the circulator 23 to be released to the light detecting section 27.

The light detecting section 27 is a component for measuring the spectrum of the light L2 (reflection spectrum, in the present embodiment). In the present embodiment, the light detecting section 27 includes: a spectroscope that disperses the light L2; and a photodiode that converts, into an electrical signal, light of each of the wavelength components of the light L2 having been dispersed.

The inserted figure in FIG. 1 is a graph schematically indicating the spectrum of the light L1, which is input light of the force sensor 10, and the spectrum of the light L2, which is output light of the force sensor 10. In the inserted figure, the spectrum of the light L1 is indicated by a solid line, and the spectrum of the light L2 is indicated by a dashed line.

As can be seen from the inserted figure, in comparison with the central wavelength of the spectrum of the light L1, the central wavelength of the spectrum of the light L2 is shifted toward longer wavelengths by a shift amount of Δλ. The shift amount Δλ is a quantity determined according to the spacing G illustrated in FIG. 1. The spacing G is a quantity determined according to the amount of deflection ΔG of the second substrate 12 observed when the point load F acts on or on the vicinity of the center of the second substrate 12. Accordingly, the shift amount Δλ of the force sensor 10 is a quantity determined according to the magnitude of the point load F. In the force sensor system 1, it is possible to detect the point load F by obtaining or calculating the correlation between the point load F and the shift amount Δλ in the force sensor 10 in advance.

[Supplementary Note]

The present invention is not limited to the above embodiments, but can be altered by a skilled person in the art within the scope of the claims. The present invention also encompasses, in its technical scope, any embodiment derived by combining technical means disclosed in differing embodiments.

REFERENCE SIGNS LIST

1: Force sensor system
10: Force sensor
11: First substrate
12: Second substrate
13: Spacer
14: Metasurface pattern
15: Protective layer
16: Reflective layer
17: Hard-coat layer
20: Measuring section

The invention claimed is:

1. A force sensor comprising:
a first substrate having light transparency;
a metasurface pattern provided on a first principal surface of the first substrate;
a protective layer that has light transparency and that covers the metasurface pattern;
a second substrate provided so as to face the first substrate and including a second principal surface that faces the first principal surface;
a reflective layer provided on the second principal surface; and
a spacer defining a spacing between the first substrate and the second substrate.

2. The force sensor according to claim 1, wherein
the second substrate is made of a metal or a resin.

3. The force sensor according to claim 2, wherein
the second substrate is made of a resin, and
the force sensor further comprises
a hard-coat layer covering a third principal surface that faces the second principal surface of a pair of principal surfaces of the second substrate.

4. The force sensor according to claim 1, wherein
an internal space that is surrounded by the first substrate, the second substrate, and the spacer and that accommodates the metasurface pattern, the protective layer, and the reflective layer is sealed.

5. The force sensor according to claim 1, wherein
at least one selected from the group consisting of the first substrate, the second substrate, and the spacer is provided with a vent that is surrounded by the first substrate, the second substrate, and the spacer and that brings an internal space and an external space into communication with each other, the internal space accommodating the metasurface pattern, the protective layer, and the reflective layer.

* * * * *